(12) United States Patent
Son et al.

(10) Patent No.: US 10,070,341 B2
(45) Date of Patent: Sep. 4, 2018

(54) METHOD AND APPARATUS FOR TRANSMITTING AND RECEIVING BUFFER STATUS INFORMATION IN WIRELESS COMMUNICATION SYSTEM

(71) Applicants: Samsung Electronics Co., Ltd., Suwon-si, Gyeonggi-do (KR); SEOUL NATIONAL UNIVERSITY R&DB FOUNDATION, Seoul (KR)

(72) Inventors: Youngwook Son, Seoul (KR); Sang-Hyun Chang, Seoul (KR); Byoung-Hoon Jung, Seoul (KR); Seongwon Kim, Seoul (KR); Seungmin Yoo, Seoul (KR); Jaehong Yi, Seoul (KR); Sunghyun Choi, Seoul (KR); Soo-Young Jang, Suwon-si (KR)

(73) Assignees: Samsung Electronics Co., Ltd., Suwon-si (KR); SEOUL NATIONAL UNIVERSITY R&DB FOUNDATION, Seoul (KR)

(*) Notice: Subject to any disclaimer, the term of this patent is extended or adjusted under 35 U.S.C. 154(b) by 113 days.

(21) Appl. No.: 15/193,736

(22) Filed: Jun. 27, 2016

(65) Prior Publication Data

US 2017/0055177 A1 Feb. 23, 2017

(30) Foreign Application Priority Data

Aug. 20, 2015 (KR) ........................ 10-2015-0117501

(51) Int. Cl.
| | | |
|---|---|---|
| *H04W 28/02* | (2009.01) | |
| *H04W 4/06* | (2009.01) | |
| *H04W 72/04* | (2009.01) | |
| *H04W 72/12* | (2009.01) | |

(52) U.S. Cl.
CPC ......... *H04W 28/0278* (2013.01); *H04W 4/06* (2013.01); *H04W 72/0446* (2013.01); *H04W 72/1205* (2013.01)

(58) Field of Classification Search
CPC .............. H04W 28/0278; H04W 4/06; H04W 72/0446; H04W 72/1205
See application file for complete search history.

(56) References Cited

U.S. PATENT DOCUMENTS

| | | | |
|---|---|---|---|
| 6,114,968 A * | 9/2000 | Ramakrishnan | .... H04L 12/2801 340/3.51 |
| 2010/0150082 A1* | 6/2010 | Shin | .................. H04W 72/1284 370/329 |

(Continued)

FOREIGN PATENT DOCUMENTS

| | | |
|---|---|---|
| EP | 2237633 A1 | 10/2010 |
| EP | 2584850 A1 | 4/2013 |
| WO | 2014019161 A1 | 2/2014 |
| WO | 2015/012077 A1 | 1/2015 |

OTHER PUBLICATIONS

IEEE Standards Association; IEEE Standard for Information technology—Telecommunications and information exchange between systems Local and metropolitan area networks—Specific requirements; Part 11: Wireless LAN Medium Access Control (MAC) and Physical Layer (PHY) Specifications; IEEE Std 802.11 TM_2012 (Revision of IEEE Std 802.11-2007); Mar. 29, 2012, New York, NY.

(Continued)

*Primary Examiner* — Ajay Cattungal
(74) *Attorney, Agent, or Firm* — Jefferson IP Law, LLP

(57) ABSTRACT

The present disclosure relates to a 5G or pre-5G communication system to be provided in order to support higher data rates after a 4G communication system, such as an LTE system. A method for receiving buffer status information by an access point in a wireless communication system is provided. In the method, a contention sub-slot and a dedicated sub-slot are determined for each station connected to the access point, a data trigger action frame is generated (Continued)

based on a first element including allocation information on the dedicated sub-slot to be used by a related station in a buffer status report (BSR) phase where each of the stations transmits buffer status information to the access point, the generated data trigger action frame is broadcasted to the stations, and a BSR frame transmitted based on the data trigger action frame is received from each of the stations.

20 Claims, 8 Drawing Sheets

(56) References Cited

U.S. PATENT DOCUMENTS

| | | | |
|---|---|---|---|
| 2012/0069805 A1* | 3/2012 | Feuersanger | H04W 72/1284 370/329 |
| 2013/0039314 A1* | 2/2013 | Prateek | H04W 74/08 370/329 |
| 2016/0157211 A1 | 6/2016 | Kato et al. | |

OTHER PUBLICATIONS

Nguyen et al.; Uplink multi-user MAC protocol for 11 ax; doc.: IEEE 11-14/0598r0; Kyushu Institute of Technology; May 11, 2014; Fukuoka; Japan.

Ryu et al.; UL MU Procedure; doc.: IEEE 802.11-1510365r0; LG Electronics; Mar. 19, 2015; Seoul, Korea.

European Office Action dated Jun. 8, 2018, issued in European Application No. 16 179 857.4-1216.

* cited by examiner

METHOD AND APPARATUS FOR TRANSMITTING AND RECEIVING BUFFER STATUS INFORMATION IN WIRELESS COMMUNICATION SYSTEM

CROSS-REFERENCE TO RELATED APPLICATION(S)

This application claims the benefit under 35 U.S.C. § 119(a) of a Korean patent application filed on Aug. 20, 2015 in the Korean Intellectual Property Office and assigned Serial No. 10-2015-0117501, the entire disclosure of which is hereby incorporated by reference.

JOINT RESEARCH AGREEMENT

The present disclosure was made by or on behalf of the below listed parties to a joint research agreement. The joint research agreement was in effect on or before the date the present disclosure was made and the present disclosure was made as a result of activities undertaken within the scope of the joint research agreement. The parties to the joint research agreement are Samsung Electronics Co. Ltd., and Seoul National University R&DB Foundation.

TECHNICAL FIELD

The present disclosure relates to a method and an apparatus for transmitting and receiving buffer status information in a wireless communication system.

BACKGROUND

In order to meet the demand for wireless data traffic which has increased since the commercialization of a fourth generation (4G) communication system, efforts have been made to develop an improved fifth generation (5G) or pre-5G communication system. Therefore, the 5G or pre-5G communication system is also called a "beyond 4G network" or a "post long-term evolution (LTE) system".

The 5G communication system is considered to be implemented in higher frequency (mm-Wave) bands (e.g., 60 GHz bands) so as to accomplish higher data rates. In order to reduce propagation loss of the radio waves and increase the transmission distance thereof, beamforming, massive multiple-input multiple-output (MIMO), full dimensional MIMO (FD-MIMO), array antenna, analog beamforming, and large scale antenna techniques are discussed in 5G communication systems.

Also, in 5G communication systems, technology development for improving a network of a system is underway based on evolved small cells, advanced small cells, cloud radio access networks (RANs), ultra-dense networks, device-to-device (D2D) communication, wireless backhaul, moving network, cooperative communication, coordinated multi-points (CoMPs), reception-side interference cancellation, and the like.

Further, in the 5G system, hybrid frequency shift keying (FSK) and quadrature amplitude modulation (QAM) modulation (FQAM) and sliding window superposition coding (SWSC) as advanced coding modulation (ACM) schemes, and filter bank multi carrier (FBMC), non-orthogonal multiple access (NOMA), and sparse code multiple access (SCMA) as advanced access technology, have been developed.

In a wireless local area network (WLAN) system according to the Institute of Electrical and Electronics Engineers (IEEE) 802.11 standard, in a basic service set (BSS) which is based on a particular access point (AP), the AP or a particular station connected to the AP monopolizes an access right to a particular channel. As a result, when two or more nodes access a particular node, for example, when two or more stations transmit uplink signals, the stations need to sequentially transmit the uplink signals, which are intended to be transmitted, based on contention or scheduling. However, this transmission scheme serves as a factor, which reduces the overall performance of a WLAN system, since overhead becomes larger as the number of stations accessing to the particular channel increases.

Accordingly, a technique, which enables multiple users to transmit uplink signals through a particular channel, is introduced to a next-generation WLAN system. In order to enable multiple users to transmit the uplink signals through the particular channel, an AP may serve as a central controller and may schedule uplink transmissions by stations included in a BSS. At this time, the AP needs buffer status-related information in order to appropriately schedule the uplink transmissions by the stations. Each of the stations may also notify the AP of a demand for the uplink transmission, and may request the AP to allocate resources required for the uplink transmission.

To this end, the AP and each station may use a buffer status report (BSR) frame. The BSR frame serves as a kind of request to send (RTS) which allows each station to request permission for uplink transmission, and, serves to deliver buffer status-related information on each station. The BSR frame is transmitted in a transmission scheme which is based on one of a distributed coordination function (DCF), a point coordination function (PCF), and a power save multi-poll (PSMP).

A DCF-based transmission scheme signifies a scheme in which, when a station desiring transmission monitors a channel during a predetermined time period and detects an unused channel, the station accesses the relevant channel and transmits an uplink signal. However, in an environment where stations are densely located, multiple channels access the detected unused channel, so that a collision may frequently occur. When the collision occurs, according to the DCF-based transmission scheme, a backoff time period is lengthened and transmission is performed in order to reduce a collision occurrence probability, and thus it is problematic that a channel is wasted.

A PCF-based transmission scheme signifies a scheme in which an AP sequentially transmits a poll message to all stations within a BSS, inquires of each station whether each station desires to perform uplink transmission, and allocates uplink resources to a station, which desires to perform the uplink transmission, on the basis of a response message of each station to the poll message. As compared with the DCF-based transmission scheme, the PCF-based transmission scheme is advantageous in that a collision does not occur, but is problematic in that much time is required since it is necessary to sequentially poll all of the stations within the BSS.

A PSMP-based transmission scheme is a scheme in which an AP as a central controller secures channel resources during a predetermined time period, allocates the secured channel resources to multiple stations, and allows the stations to sequentially transmit uplink signals. The PSMP-based transmission scheme is different from the PCF-based transmission scheme in that the AP allocates resources to multiple previously-selected stations without polling stations, and enables each station to request the AP to additionally allocate resources in the form of a piggyback when each station transmits an uplink signal.

As described above, the DCF-based transmission scheme and the PCF-based transmission scheme require much time to collect BSR frames from multiple stations due to a backoff delay and polling, respectively, and thus are inefficient. Also, according to the PSMP-based transmission scheme, uplink transmission is performed based on scheduling by an AP without separate polling or buffer-related information of a station, and thus overhead caused by unnecessary resource allocation is inevitable.

Accordingly, there is a need for a method capable of efficiently transmitting a BSR frame even in an environment where stations are densely located.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and an apparatus for transmitting and receiving buffer status information in a wireless communication system.

Another aspect of the present disclosure is to provide a method and an apparatus by which an access point (AP) transmits information related to transmission of buffer status information to a station before the transmission of the buffer status information in a wireless communication system.

Another aspect of the present disclosure is to provide a method and an apparatus by which, in a wireless communication system, an AP transmits sub-slot information related to transmission of buffer status information to a station in such a manner to divide the sub-slot information into a dedicated sub-slot and a contention sub-slot.

Another aspect of the present disclosure is to provide a method and an apparatus by which an AP transmits information representing the position of a dedicated sub-slot within each slot related to transmission of buffer status information to a station in a wireless communication system.

Another aspect of the present disclosure is to provide a method and an apparatus by which, in a wireless communication system, an AP adjusts the number of contention sub-slots related to transmission of buffer status information in view of the collision degree of the buffer status information received from a station.

In accordance with an aspect of the present disclosure, a method for receiving buffer status information by an AP in a wireless communication system is provided. The method includes determining a contention sub-slot and a dedicated sub-slot for each station connected to the AP, generating a data trigger action frame based on a first element including allocation information on the dedicated sub-slot to be used by a relevant station in a buffer status report (BSR) phase where each of the stations transmits buffer status information to the AP, broadcasting the generated data trigger action frame to the stations, and receiving a BSR frame transmitted based on the data trigger action frame from each of the stations.

In accordance with another aspect of the present disclosure, a method for transmitting buffer status information by a station in a wireless communication system is provided.

The method includes receiving a data trigger action frame including allocation information on a dedicated sub-slot to be used by the station, from an AP, and transmitting a BSR frame to the AP based on the received data trigger action frame.

In accordance with another aspect of the present disclosure, an AP for receiving buffer status information in a wireless communication system is provided. The AP includes a controller configured to determine a contention sub-slot and a dedicated sub-slot for each station connected to the AP and generate a data trigger action frame based on a first element including allocation information on the dedicated sub-slot to be used by a relevant station in a BSR phase where each of the stations transmits buffer status information to the AP, a transmitter configured to broadcast the generated data trigger action frame to the stations, and a receiver configured to receive a BSR frame transmitted based on the data trigger action frame from each of the stations.

In accordance with another aspect of the present disclosure, a station for transmitting buffer status information in a wireless communication system is provided. The station includes a receiver configured to receive a data trigger action frame including allocation information on a dedicated sub-slot to be used by the station, from an AP, and a transmitter configured to transmit a BSR frame to the AP based on the received data trigger action frame.

Embodiments of the present disclosure are advantageous in that an AP efficiently can collect pieces of buffer status information of respective stations in the environment where the stations are densely located, and can appropriately schedule simultaneous transmissions by multiple users. As a result, the various embodiments of the present disclosure are advantageous in that the transmission throughput of a wireless communication system can be improved.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
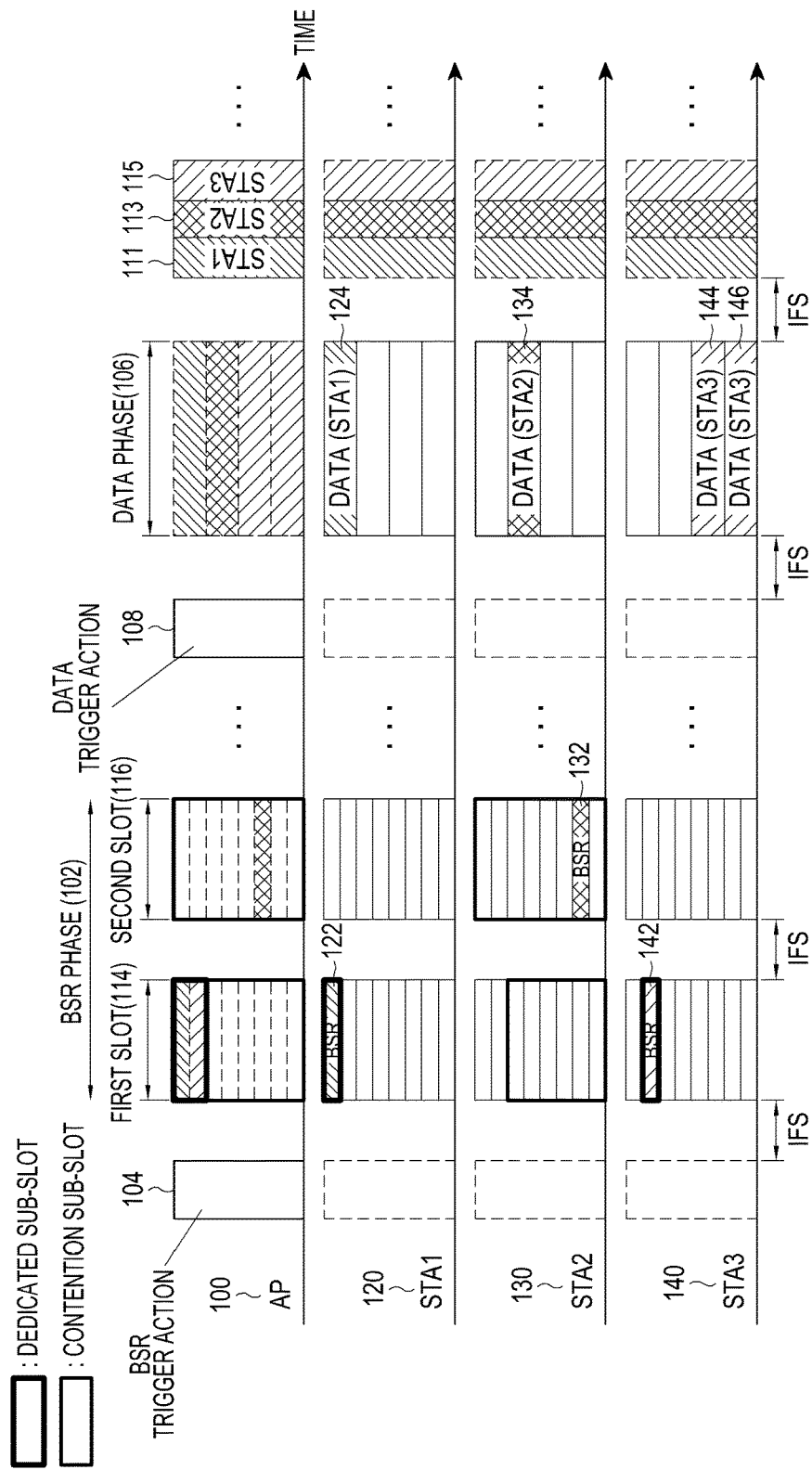
FIG. 1 is a view illustrating an example of an operation of a station for transmitting a buffer status report (BSR) frame in a BSR phase in a wireless communication system according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a", "an", and "the" include plural referents unless the context clearly indicates otherwise. Thus, for example, reference to a "component surface" includes reference to one or more of such surfaces.

The terms "include" and "comprise", as well as derivatives thereof, mean inclusion without limitation. The term "or" is inclusive, meaning and/or. The phrases "associated with" and "associated therewith", as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. The term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely.

Although the terms including an ordinal number such as first, second, etc. may be used for describing various elements, the structural elements are not restricted by the terms. The terms are used merely for the purpose of distinguishing an element from other elements. For example, a first element could be termed a second element, and similarly, a second element could be also termed a first element without departing from the scope of the present disclosure.

In the present disclosure, the terms such as "include" and/or "have" may be construed to denote a certain characteristic, number, step, operation, constituent element, component or a combination thereof, but may not be construed to exclude the existence of or a possibility of addition of one or more other characteristics, numbers, steps, operations, constituent elements, components or combinations thereof.

Unless defined otherwise, all terms used herein, including technical and scientific terms, have the same meaning as those commonly understood by a person of ordinary skill in the art to which the present disclosure pertains. Such terms as those defined in a generally used dictionary are to be interpreted to have the meanings equal to the contextual meanings in the relevant field of art, and are not to be interpreted to have ideal or excessively formal meanings unless clearly defined in the present specification.

According to various embodiments of the present disclosure, an electronic device may include a communication functionality. The terminal may, for example, be a smart phone, a tablet personal computer (PC), a mobile phone, a video phone, an e-book reader, a desktop PC, a laptop PC, a netbook PC, a personal digital assistant (PDA), a portable multimedia player (PMP), a Moving Picture Experts Group phase 1 or phase 2 (MPEG-1 or MPEG-2) audio layer 3 (MP3) player, a mobile medical device, a camera, or a wearable device (e.g., head-mounted device (HMD), electronic clothes, an electronic bracelet, an electronic necklace, an electronic appcessory, an electronic tattoo, or a smart watch).

According to various embodiments of the present disclosure, the terminal may be a smart home appliance with a communication functionality. The smart home appliance may, for example, be a television (TV), a digital versatile disc (DVD) player, an audio player, a refrigerator, an air conditioner, a vacuum cleaner, an oven, a microwave, a washer, a drier, an air purifier, a set-top box, a TV box (e.g., Samsung HomeSync™, Apple TV™, or Google TV™), a gaming console, an electronic dictionary, a camcorder, or an electronic photo frame.

According to various embodiments of the present disclosure, the electronic device may be a medical appliance (e.g., magnetic resonance angiography (MRA) device, magnetic resonance imaging (MRI) device, computed tomography (CT) device, and ultrasonic device), a navigation device, a global positioning system (GPS) receiver, an event data recorder (EDR), a flight data recorder (FDR), an automotive infotainment device, a marine electronic device (e.g., ship navigation device, a gyrocompass or a compass), avionics, security equipment, or an industrial or home robot.

According to various embodiments of the present disclosure, the terminal may be a part of furniture or a building/structure, an electronic board, an electronic signature receiving device, a projector, and various kinds of measuring instruments (e.g., water meter, electric meter, gas meter, and electromagnetic wave meter), each of which has a communication functionality.

According to various embodiments of the present disclosure, the terminal may be a combination of the above-mentioned devices. Further, it will be apparent to those skilled in the art that the terminal according to various embodiments of the present disclosure is not limited to the above-mentioned devices.

A method and an apparatus proposed in an embodiment of the present disclosure can be applied to mobile broadcast services, such as an Institute of Electrical and Electronics Engineers (IEEE) 802.11 communication system, an IEEE 802.16 communication system, a digital multimedia broadcasting (DMB) service, digital video broadcasting-handheld (DVP-H) service, an advanced TV systems committee-mobile/handheld (ATSC-M/H) service, and the like, a digital video broadcasting system, such as an Internet protocol TV (IPTV) service, and various communication systems, such as an MPEG media transport (MMT) system, an evolved packet system (EPS), a long-term evolution (LTE) communication system, an LTE-advanced (LTE-A) communication system, a high speed downlink packet access (HSDPA) mobile communication system, a high speed uplink packet access (HSUPA) mobile communication system, a high rate packet data (HRPD) mobile communication system of Third Generation Partnership Project 2 (3GPP2), a wideband code division multiple access (WCDMA) mobile communication system of 3GPP2, a CDMA mobile communication system of 3GPP2, a mobile IP system, and the like.

In various embodiments of the present disclosure as described below, a phase is defined in which each station transmits, to an access point (AP), a buffer status report (BSR) frame including buffer-related information thereof. Hereinafter, a phase in which stations connected to an AP transmit BSR frames to the AP is referred to as a "BSR phase." The BSR phase starts when the AP broadcasts a BSR trigger action frame to stations within a BS S.

An embodiment of the present disclosure defines, as a sub-slot, a basic unit of channel resources that a station uses to transmit a BSR frame in a BSR phase, and defines one slot when multiple sub-slots are added together along a frequency axis and form an entire channel during a predetermined time period. The sub-slots are divided in detail into contention resources and non-contention resources. The contention resources signify resources that stations can access in a contention scheme, and the non-contention resources signify dedicated resources used to poll stations. Hereinafter, for convenience of description, contention resources which form sub-slots are referred to as a "contention sub-slot," and non-contention resources which form sub-slots are referred to as a "dedicated sub-slot."

FIG. 1 is a view illustrating an example of an operation of a station for transmitting a BSR frame in a BSR phase in a wireless communication system according to an embodiment of the present disclosure.

Referring to FIG. 1, a case is considered in which a wireless communication system includes an AP 100, a first station STA1 120, a second station STA2 130, and a third station STA3 140.

The AP 100 broadcasts a BSR trigger action frame 104 to the first station 120 to the third station 140. The BSR trigger action frame 104 is a frame which schedules a BSR phase 102 including two slots, and includes scheduling information on a time axis and scheduling information on a frequency axis of a sub-slot to be used for transmission of a BSR by each of the first station 120 to the third station 140 in the BSR phase 102, and information representing whether the sub-slot to be used for the transmission of the BSR by each station is a dedicated sub-slot. The BSR trigger action frame 104 will be described in more detail with reference to FIG. 3 below.

Referring to FIG. 1, a case is considered in which each slot includes eight sub-slots, each of two sub-slots included in a first slot 114 among a total of 16 sub-slots represents a dedicated sub-slot pre-allocated to the first station 120 and the third station 140, and the remaining six sub-slots except for the two sub-slots of the first slot 114 and eight sub-slots included in a second slot 116 represent contention sub-slots.

The first station 120, which has received the BSR trigger action frame 104 broadcasted by the AP 100, detects a sub-slot to be used to transmit a BSR on the basis of information included in the BSR trigger action frame 104, and transmits a BSR frame in the detected dedicated sub-slot 122. More specifically, the first station 120 has received the BSR trigger action frame 104, and transmits the BSR frame in the detected dedicated sub-slot 122 after the passage of a certain inter-frame space (IFS). The BSR frame includes buffer-related information of a station. For example, the BSR frame may include identifier (ID) information of a station, address information of a subject AP, transmission power information used to transmit the BSR frame, buffer size information of the station, and the like. The BSR frame will be described in more detail with reference to FIG. 2 below.

The second station 130, which has received the BSR trigger action frame 104 broadcasted by the AP 100, detects a sub-slot to be used to transmit a BSR on the basis of information included in the BSR trigger action frame 104. At this time, the sub-slot detected by the second station 130 is a contention sub-slot, and thus the second station 130 transmits a BSR frame in one contention sub-slot 132 optionally selected from among 14 contention sub-slots.

The third station 140, which has received the BSR trigger action frame 104 broadcasted by the AP 100, detects a sub-slot to be used to transmit a BSR on the basis of information included in the BSR trigger action frame 104, and transmits a BSR frame in the detected dedicated sub-slot 142. More specifically, the third station 140 has received the BSR trigger action frame 104, and transmits a BSR frame in the detected dedicated sub-slot 142 after the passage of an IFS.

As described above, the AP 100, which has received the BSR frame from each of the first station 120 to the third station 140, performs resource allocation and scheduling for data transmission on the basis of information of the BSR frame received from each station, and broadcasts a result of performing the resource allocation and the scheduling to the first station 120 to the third station 140 through a data trigger action frame 108. In the present example, the term "resource allocation and scheduling" refers to the determination of a channel through which each station transmits data, a time point from which each station transmits data, and a time period during which each station transmits data. Also, the data trigger action frame 108 will be described in more detail with reference to FIG. 2 below.

Thereafter, the stations 120, 130 and 140, which have received the data trigger action frame 108 broadcasted by the AP 100, respectively transmit data frames 124, 134, 144 and 146 on the basis of information included in a data trigger action frame 108 in a data phase 106 after the passage of an IFS. The AP 100, which has received the data frames 124, 134, 144 and 146, respectively transmits acknowledgement (ACK) frames 111, 113 and 115, which respectively correspond to the data receptions, to the stations 120, 130 and 140 after the passage of an IFS.

Figure 2:
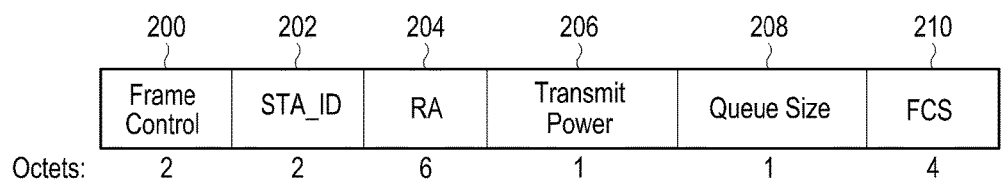
FIG. 2 is a view illustrating an example of a BSR frame format transmitted by a station in a wireless communication system according to an embodiment of the present disclosure.

FIG. 2 is a view illustrating an example of a BSR frame format transmitted by a station in a wireless communication system according to an embodiment of the present disclosure.

Referring to FIG. 2, a BSR frame serves to allow the station to send a request for resources for uplink transmission to the AP, and serves to deliver buffer-related information of the station.

The BSR frame essentially includes a two-byte frame control field 200 and a four-byte frame check sequence (FCS) field 210. Here, the FCS field 210 is used for error detection.

Also, the BSR frame additionally includes a 2-byte station ID (STAID) field 202, a 6-byte receiver address (RA) field 204, a 1-byte transmit power field 206, and a 1-byte queue size field 208. The STA_ID field 202 includes unique ID information of the station. The RA field 204 includes media access control (MAC) address-related information of an AP. The transmit power field 206 includes information related to transmission power used to transmit a BSR frame. The queue size field 208 includes buffer size-related information of the station.

Figure 3:
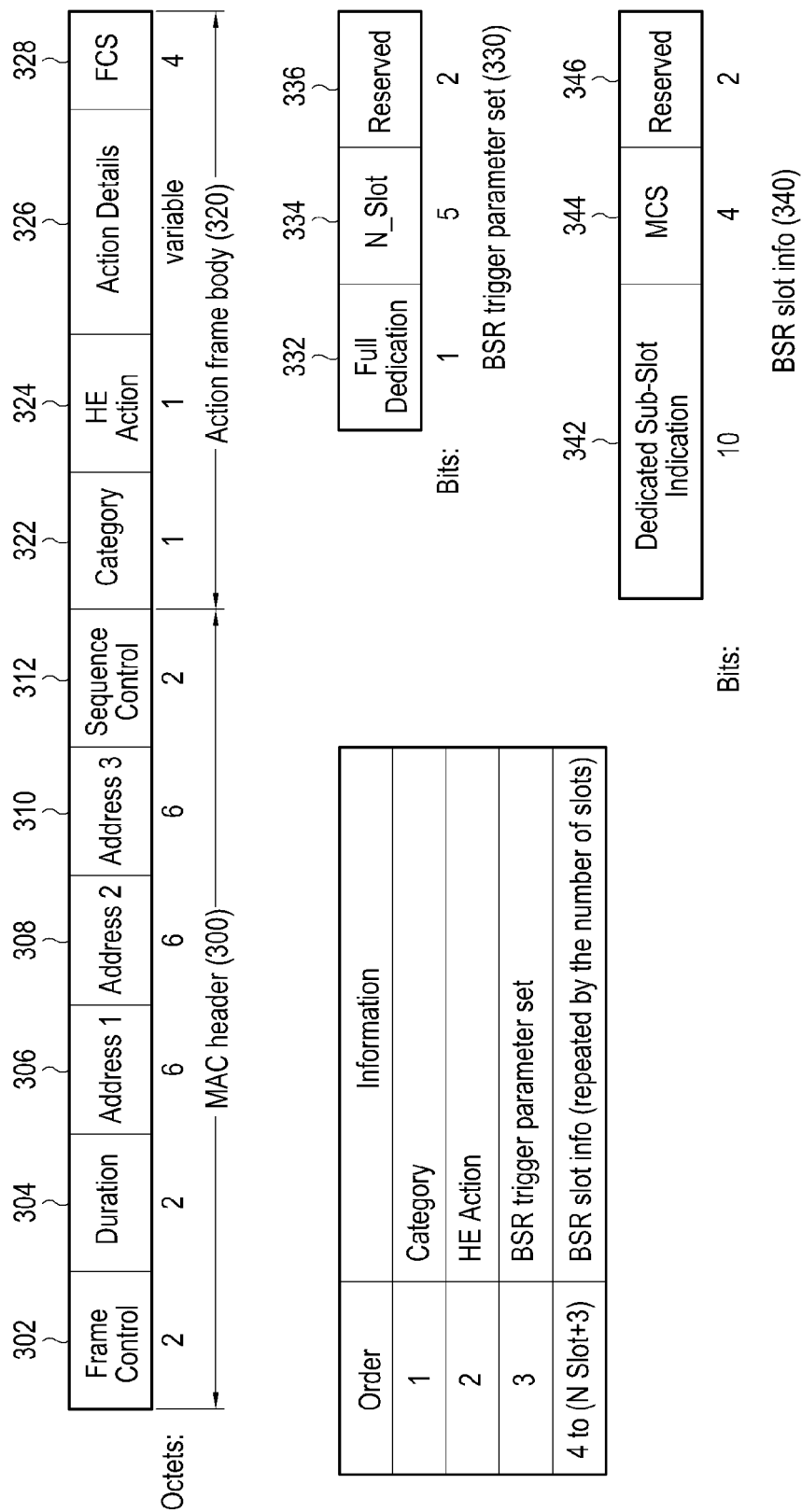
FIG. 3 is a view illustrating an example of a BSR trigger action frame format transmitted by a station in a wireless communication system according to an embodiment of the present disclosure.

FIG. 3 is a view illustrating an example of a BSR trigger action frame format transmitted by a station in a wireless communication system according to an embodiment of the present disclosure.

Referring to FIG. 3, the BSR trigger action frame includes a MAC header 300 of a total size of 24 bytes, and an action frame body 320 of a variable size.

In FIG. 3, the MAC header 300 includes a 2-byte frame control field 302, a 2-byte duration field 304, 6-byte address fields 306, 308 and 310, and a 2-byte sequence control field 312. The action frame body 320 includes a 1-byte category field 322, a 1-byte high efficiency (HE) action field 324, an action details field 326 of a variable size, and 4-byte FCS field 328. The category field 322 includes category information. The HE action field 324 includes action frame type-related information. The action details field 326 includes information related to an actually-indicated action. The FCS field 328 is used for error detection.

Also, the action details field 326 includes two elements, namely, a BSR trigger parameter set element 330 and a BSR slot information element 340.

First, the BSR trigger parameter set element 330 includes a 1-bit full dedication field 332, a 5-bit N_slot field 334, and a 2-bit reserved field 336. In the present example, the N_slot field 334 includes information related to the number of slots.

The full dedication field 332 is a field representing whether a sub-slot is a dedicated sub-slot, and represents that all sub-slots in this BSR phase are dedicated sub-slots when the value of the full dedication field 332 is set to, for example, 1. When the value of the full dedication field 332 is set to 1, the station may transmit a BSR frame in a unique sub-slot of the station according to a predetermined rule without separate allocation information.

A case where the value of the full dedication field 332 is set to 1 as described above, namely, a case where all sub-slots in a BSR phase are dedicated sub-slots, corresponds to a case where the number of sub-slots, which can be used to transmit a BSR frame, is greater than that of stations connected to the AP. In this case, every station connected to the AP transmits a BSR frame in a designated sub-slot, so that a collision risk can be removed in advance.

The N_slot field 334 is a field which represents the number of slots existing on the time axis in this BSR phase and becomes an element which determines the number of a total of sub-slots and an entire duration in the BSR phase.

The BSR slot information element 340 includes 10-bit dedicated sub-slot indication field 342, 4-bit modulation and coding scheme (MCS) field 344, and 2-bit reserved field 346. The BSR slot information element 340 includes information on respective slots forming a BSR phase. The action frame body 320 includes as many BSR slot information elements 340s as the number of the slots forming the BSR phase. Accordingly, the number of the BSR slot information elements 340s included in the action frame body 320 is identical to the number of slots indicated by the N_slot field 334.

The dedicated sub-slot indication field 342 includes information representing the position of a dedicated sub-slot within each slot, and the MCS field 344 includes an MCS level value to be used when a BSR frame is transmitted in each slot.

The allocation of the dedicated sub-slot is performed on the basis of BSR frames received until a BSR phase before the AP transmits a BSR trigger action frame. The AP allocates a dedicated sub-slot in view of buffer sizes of stations which are represented by queue size fields included in the received BSR frames. Also, the allocated dedicated sub-slot is not fixed, but is flexibly determined in each BSR phase.

Figure 4:
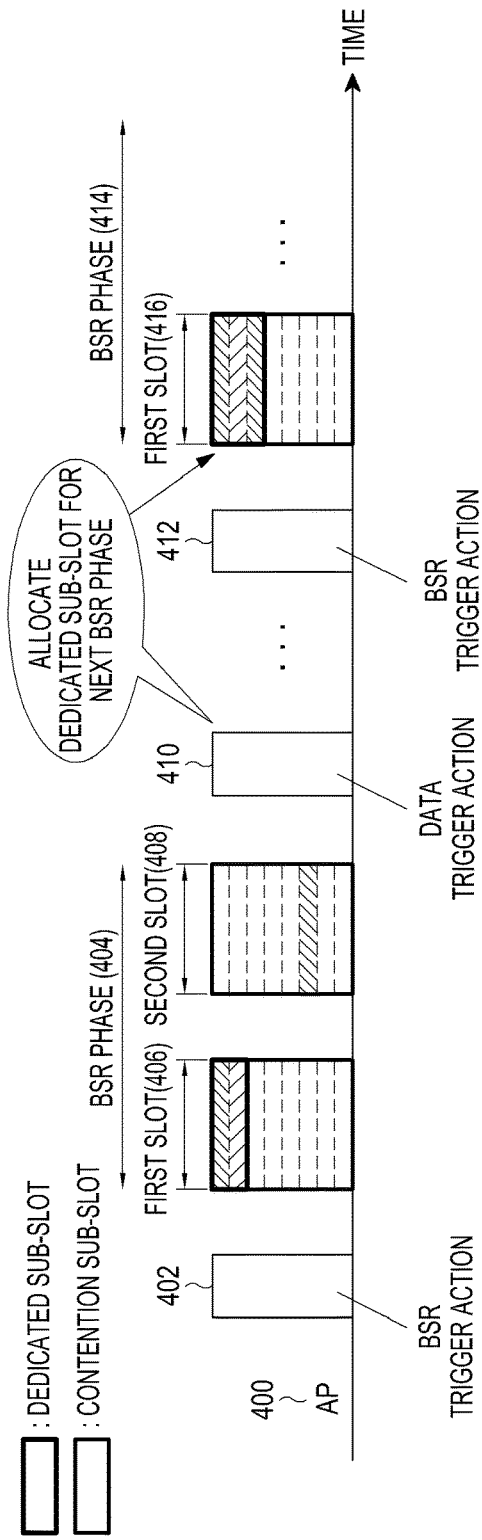
FIG. 4 is a view illustrating an example of an operation of indicating a dedicated sub-slot through a data trigger action frame in a wireless communication system according to an embodiment of the present disclosure.

FIG. 4 is a view illustrating an example of an operation of indicating a dedicated sub-slot through a data trigger action frame in a wireless communication system according to an embodiment of the present disclosure.

Referring to FIG. 4, an AP 400 broadcasts a BSR trigger action frame 402 to stations connected to the AP 400. The BSR trigger action frame 402 is a frame which schedules a BSR phase 404 including two slots. The BSR trigger action frame 402 includes scheduling information on the time axis and scheduling information on the frequency axis of a sub-slot to be used for transmission of a BSR by each of the stations in the BSR phase 404, and information representing whether the sub-slot to be used for the transmission of the BSR by each station is a dedicated sub-slot.

In FIG. 4, a case is considered in which each slot includes eight sub-slots, each of two sub-slots included in a first slot 406 among a total of 16 sub-slots represents a dedicated sub-slot pre-allocated to a particular station, and the remaining six sub-slots except for the two sub-slots of the first slot 406 and eight sub-slots included in a second slot 408 represent contention sub-slots.

Thereafter, the AP 400 receives BSR frames of stations transmitted in respective dedicated sub-slots and a BSR frame of a station transmitted in any one from among contention sub-slots.

The AP 400 broadcasts a data trigger action frame 410 to the stations connected to the AP 400. The AP 400 may predict which station is to transmit a BSR frame in a next BSR phase 414 on the basis of buffer information of the respective stations collected through BSR frames received in the previous BSR phase 404. Accordingly, the AP 400 may pre-allocate a dedicated sub-slot to a particular station.

Also, the data trigger action frame 410 may include not only information related to the allocation of the dedicated sub-slot 416 in the next BSR phase 414, but also information on resource allocation and scheduling for uplink data transmission. More specifically, the AP 400 determines resources through which each station transmits data, a time point from which each station transmits data, and a time period during which each station transmits data. The AP 400 includes information on resource allocation and scheduling, which is a result of the determination, in the data trigger action frame 410, and broadcasts, to each station, the data trigger action frame 410 including the information on the resource allocation and the scheduling.

Meanwhile, the number of contention sub-slots given in the BSR phase 414 may be adaptively adjusted according to the collision degree of BSR frames in the previous BSR phase 404. More specifically, the AP 400 may increase or decrease the number of contention sub-slots given in the next BSR phase 414, according to the number of contention sub-slots between which the collision has occurred that the AP 400 has detected in the BSR phase 404. For example, when the AP 400 has detected a collision between BSR frames in five contention sub-slots at the previous BSR phase 404, the AP 400 adjusts and increases the number of contention sub-slots given in the next BSR phase 414 to be greater than or equal to twice the number of the contention sub-slots between which the collision has been detected. More specifically, the AP 400 provides contention sub-slots, the number of which increases to be greater than or equal to 10, in the next BSR phase 414. As described above, the AP 400 may increase the number of contention sub-slots given in the next BSR phase 414 as the collision degree of BSR frames becomes larger in the previous BSR phase 404, and thereby may reduce a collision probability in the next BSR phase 414.

Also, the number of slots forming a particular BSR phase is determined to include all of pre-allocated dedicated sub-slots and the contention sub-slots adaptively adjusted according to the collision degree of the BSR frames in the previous BSR phase. The stations are notified of the number of slots as determined above through a BSR trigger action frame 412 notifying of the start of the particular BSR phase. Further, as described above with reference to FIG. 3, when the finally-determined number of sub-slots is greater than that of stations connected to the AP, the AP sets the value of a full dedication field of the BSR trigger action frame to 1, and broadcasts the BSR trigger action frame, of which the value of the full dedication field is set to 1. In this case, the stations may transmit BSR frames in their respective unique sub-slots without the need to compete with each other.

Figure 5:
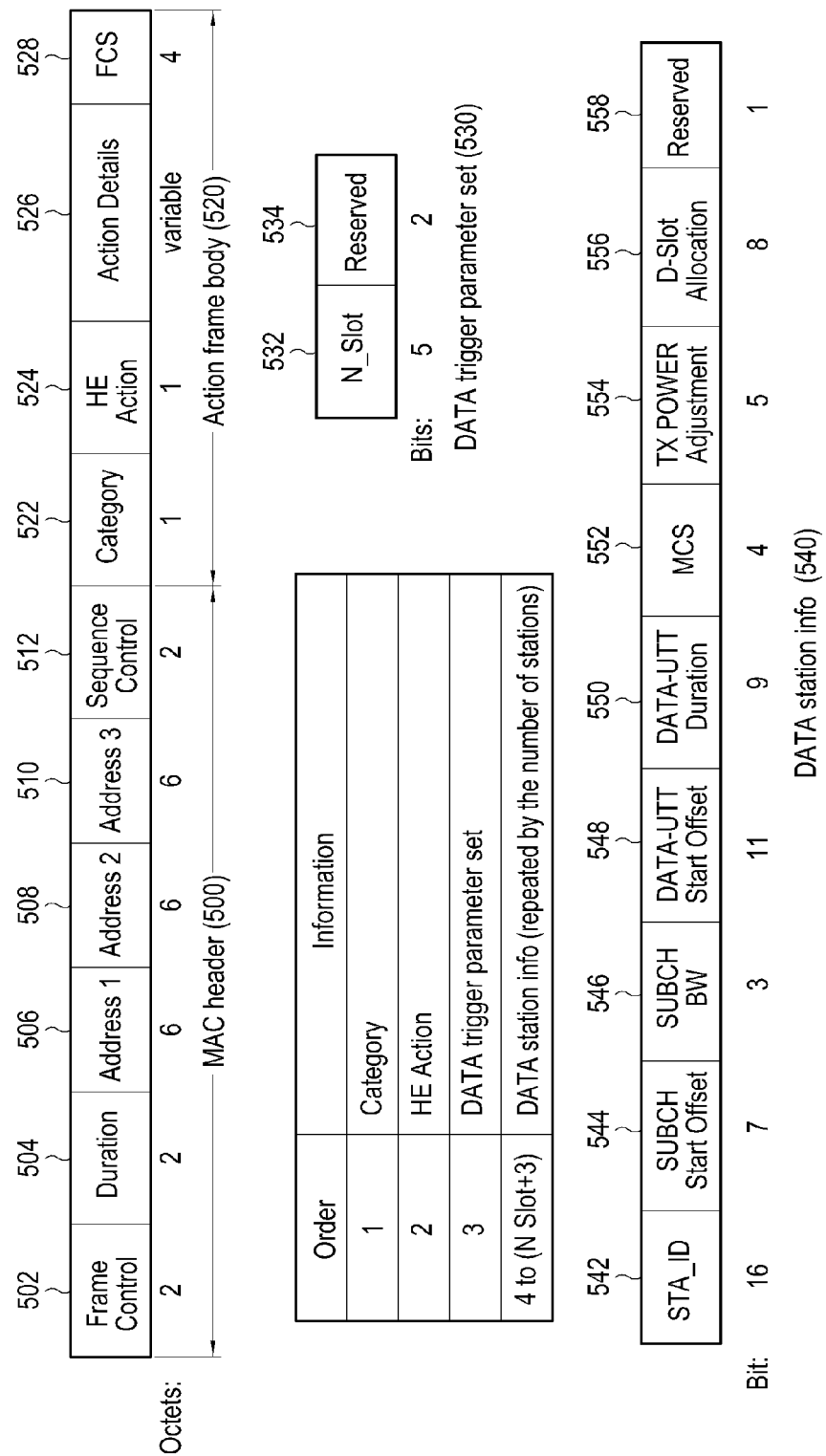
FIG. 5 is a view illustrating an example of a data trigger action frame format transmitted by a station in a wireless communication system according to an embodiment of the present disclosure.

FIG. 5 is a view illustrating an example of a data trigger action frame format transmitted by a station in a wireless communication system according to an embodiment of the present disclosure.

Referring to FIG. 5, a data trigger action frame includes a MAC header 500 of a total size of 24 bytes and an action frame body 520 of a variable size.

In FIG. 5, the MAC header 500 includes a 2-byte frame control field 502, a 2-byte duration field 504, 6-byte address fields 506, 508 and 510, and 2-byte sequence control field 512. The action frame body 520 includes a 1-byte category field 522, a 1-byte HE action field 524, an action details field 526 of a variable size, and 4-byte FCS field 528. The category field 522 includes category information. The HE action field 524 includes action frame type-related information. The action details field 526 includes information related to an actually-indicated action. The FCS field 528 is used for error detection.

Also, the action details field 526 largely includes two elements, namely, a data trigger parameter set element 530 and a data station information element 540.

First, the data trigger parameter set element 530 includes an 11-bit N_STA field 532 and a 5-bit reserved field 534. In the present example, the N_STA field 532 includes information related to the number of stations to be allocated resources.

The data station information element 540 includes a 16-bit STA_ID field 542, a 7-bit sub-channel (SUBCH) start offset field 544, a 3-bit SUBCH bandwidth (BW) field 546, an 11-bit data-uplink transmission time (UTT) start offset field 548, a 9-bit data-UTT duration field 550, a 4-bit MCS field 552, a 5-bit transmission (TX) power adjustment field 554, an 8-bit dedicated sub-slot (D_Slot) allocation field 556, and a 1-bit reserved field 558. Also, the data station information element 540 includes information on resource allocation and scheduling for uplink data transmission for each station. The action frame body 520 includes as many data station information elements 540 as the number of stations to be allocated resources. Accordingly, the number of data station information elements 540 included in the action frame body 520 is identical to that of stations indicated by the N_STA field 532.

The STA_ID field 542 includes unique ID information of the relevant station. The SUBCH start offset field 544 includes a start offset value of frequency resources to be used during data transmission. The SUBCH BW field 546 includes BW information of frequency resources to be used during data transmission. The data-UTT start offset field 548 includes a start offset value of time resources to be used during data transmission. The data-UTT duration field 550 includes the value of a duration for which data transmission is maintained.

The MCS field 552 includes an MCS level value to be used during data transmission. The TX power adjustment field 554 includes an adjustment value of TX power. The D_Slot allocation field 556 includes allocation information on a dedicated sub-slot to be used by the relevant station in a next BSR phase. When a transmission sub-slot is not allocated to the relevant station in the next BSR phase, the value of the D_Slot allocation field 556 is set to 0.

Figure 6:
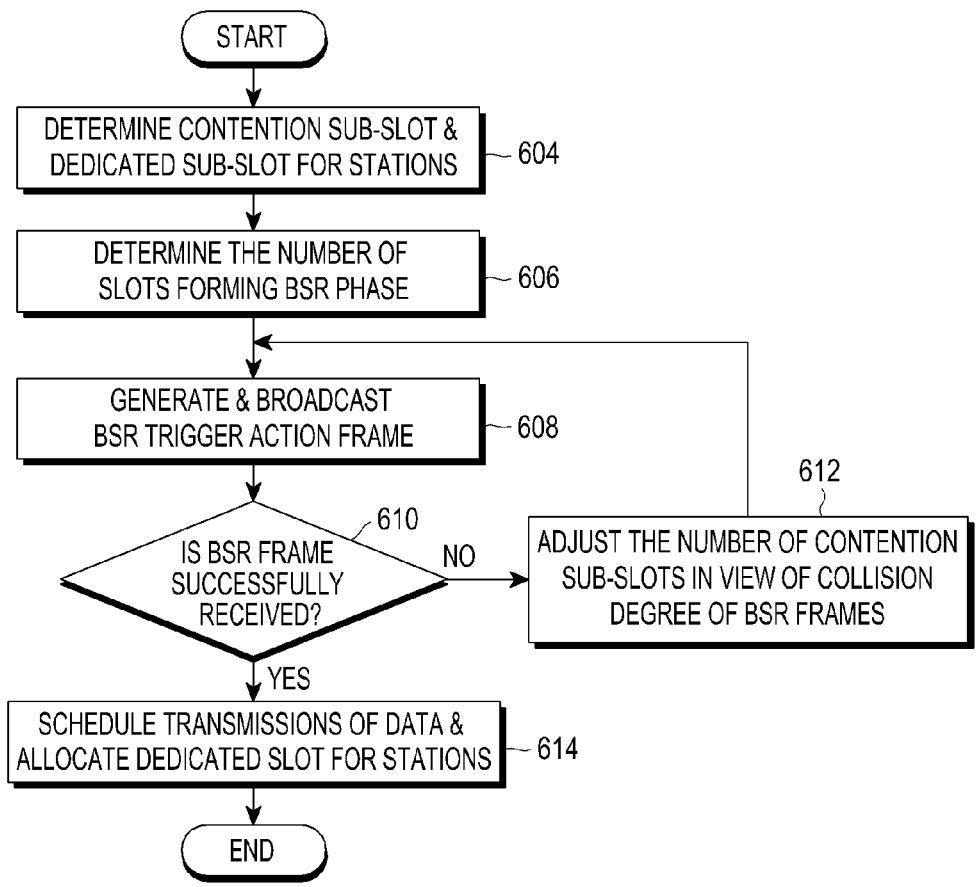
FIG. 6 is a flowchart illustrating an operation of an access point (AP) for receiving a BSR frame in a wireless communication system according to an embodiment of the present disclosure.

FIG. 6 is a flowchart illustrating an operation of an AP for receiving a BSR frame in a wireless communication system according to an embodiment of the present disclosure.

Referring to FIG. 6, in operation 604, the AP determines a contention sub-slot and a dedicated sub-slot for the stations in view of the collision degree of BSR frames received in the previous operation. In operation 606, the AP determines the number of slots forming a BSR phase. At this time, the AP determines the number of slots to include all of the contention sub-slot and the dedicated sub-slot.

In operation 608, the AP generates a BSR trigger action frame on the basis of information related to the contention sub-slot and the dedicated sub-slot and the number of slots forming the BSR phase, and broadcasts the generated BSR trigger action frame to the stations.

In operation 610, the AP determines whether a BSR frame transmitted by each of the stations is successfully received. When the BSR frame transmitted by each of the stations is successfully received, the AP proceeds to operation 614, and schedules the stations to transmit data. Also, in operation 614, the AP schedules the stations to transmit data, and, allocates a dedicated sub-slot to a particular station when the AP predicts that the particular station will transmit a BSR frame in a next BSR phase following the BSR phase, on the basis of buffer information acquired from the successfully-received BSR frames. The total number of the allocated dedicated sub-slots is reflected during the generation of a BSR trigger action frame transmitted before the next BSR phase starts.

However, when it is determined in operation 610 that the BSR frame is not successfully received, the AP proceeds to operation 612, and adjusts the number of contention sub-slots, which has been determined in operation 604, in view of the collision degree of the BSR frames. More specifically, when the AP has detected the collision between the BSR frames, the AP adjusts and increases the number of contention sub-slots given in the next BSR phase to be greater than or equal to twice the number of the contention sub-slots, between which the collision has been detected. The number of contention sub-slots as adjusted above is reflected during the generation of a BSR trigger action frame in which the next BSR phase starts.

Meanwhile, although not illustrated, when it is determined in operation 610 that only some of the BSR frames transmitted by the respective stations have been successfully received, the AP schedules only stations to transmit data, wherein the BSR frames transmitted by the relevant stations from among the stations have been successfully received. As described in operation 614, the AP schedules the transmissions of data and allocates a dedicated sub-slot to a particular station when the AP predicts that the particular station will transmit a BSR frame in the next BSR phase on the basis of buffer information acquired from the successfully-received BSR frames. The total number of the allocated dedicated sub-slots is reflected during the generation of a BSR trigger action frame transmitted before the next BSR phase starts. Then, the AP adjusts the number of contention sub-slots for the next BSR phase as in operation 612, in view of the collision degree of the BSR frames with respect to unsuccessfully-received BSR frames.

Figure 7:
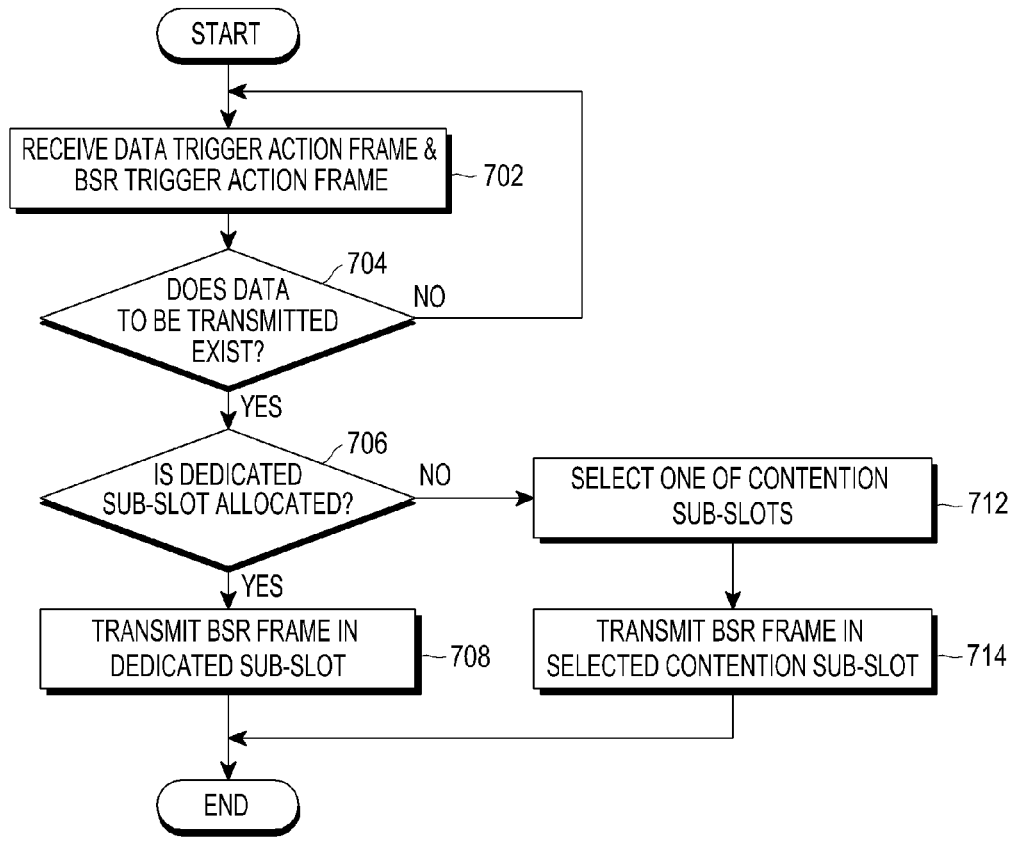
FIG. 7 is a flowchart illustrating an operation of a station for transmitting a BSR frame in a wireless communication system according to an embodiment of the present disclosure.

FIG. 7 is a flowchart illustrating an operation of a station for transmitting a BSR frame in a wireless communication system according to an embodiment of the present disclosure.

Referring to FIG. 7, in operation 702, the station receives a data trigger action frame and a BSR trigger action frame, which have been broadcasted by the AP, and determines, in operation 704, whether the station has data to be transmitted. The station, which has determined in operation 704 to have no data to be transmitted, returns to operation 702. In the present example, the BSR trigger action frame signifies a frame in which a BSR phase of transmitting a BSR frame by the station starts. The data trigger action frame signifies a frame received before the BSR trigger action frame.

In contrast, the station, which has determined in operation 704 to have the data to be transmitted, proceeds to operation 706, and determines whether a dedicated sub-slot is allocated to the station itself. More specifically, the station determines whether the dedicated sub-slot is allocated to the station itself, on the basis of the BSR trigger action frame and the data trigger action frame. The station, which has determined in operation 706 to be allocated the dedicated sub-slot, proceeds to operation 708, and transmits a BSR frame to the AP in the dedicated sub-slot. More specifically, in operation 708, the station identifies the position of the dedicated sub-slot indicated by the data trigger action frame, and transmits the BSR frame in the identified dedicated sub-slot. However, the station, which has determined in operation 706 not to be allocated the dedicated sub-slot, proceeds to operation 712, and randomly selects one of contention sub-slots. In operation 714, the station transmits a BSR frame to the AP in the contention sub-slot selected in operation 712. More specifically, the station identifies positions of contention sub-slots, which are the remaining sub-slots except for the dedicated sub-slot indicated by the data trigger action frame, and transmits the BSR frame in one sub-slot selected from among the identified contention sub-slots.

Figure 8:
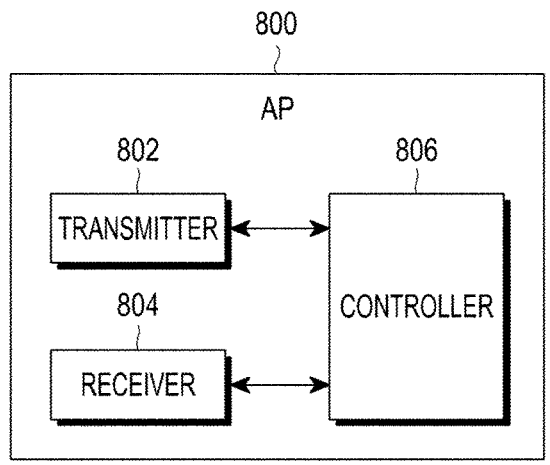
FIG. 8 is a block diagram illustrating an internal configuration of an AP that receives a BSR frame in a wireless communication system according to an embodiment of the present disclosure.

FIG. 8 is a block diagram illustrating an internal configuration of an AP that receives a BSR frame in a wireless communication system according to an embodiment of the present disclosure.

Referring to FIG. 8, the AP 800 includes a transmitter 802, a receiver 804, and a controller 806.

The controller 806 controls an overall operation of the AP 800. For example, the controller 806 controls the execution of an overall operation related to the reception of a BSR frame according to an embodiment of the present disclosure. In the present example, the overall operation related to the reception of a BSR frame is similar to that as described above with reference to FIGS. 1 to 6, and thus a detailed description thereof will be omitted.

The transmitter 802 transmits various messages and the like according to the control of the controller 806. In the present example, the various messages and the like, that the transmitter 802 transmits, are similar to those as described above with reference to FIGS. 1 to 6, and thus a detailed description thereof will be omitted.

The receiver 804 receives various messages and the like according to the control of the controller 806. In the present example, the various messages and the like, that the receiver 804 receives, are similar to those as described above with reference to FIGS. 1 to 6, and thus a detailed description thereof will be omitted.

Figure 9:
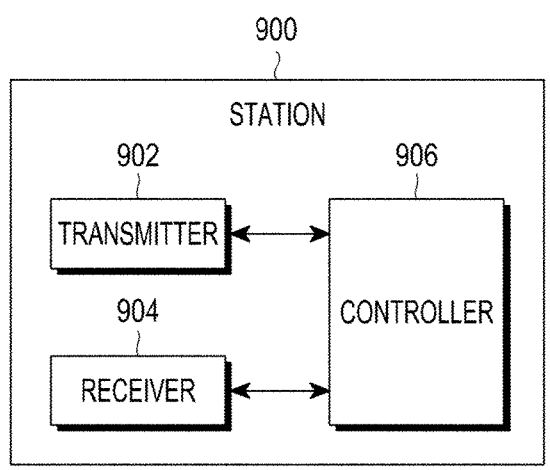
FIG. 9 is a block diagram illustrating an internal configuration of a station that transmits a BSR frame in a wireless communication system according to an embodiment of the present disclosure.

FIG. 9 is a block diagram illustrating an internal configuration of a station that transmits a BSR frame in a wireless communication system according to an embodiment of the present disclosure.

Referring to FIG. 9, the station 900 includes a transmitter 902, a receiver 904, and a controller 906.

The controller 906 controls an overall operation of the station 900. For example, the controller 906 controls the execution of an overall operation related to the transmission of a BSR frame according to an embodiment of the present disclosure. In the present example, the overall operation related to the transmission of a BSR frame is similar to that as described above with reference to FIGS. 1, 5, and 7, and thus a detailed description thereof will be omitted.

The transmitter 902 transmits various messages and the like according to the control of the controller 906. In the present example, the various messages and the like, that the transmitter 902 transmits, are similar to those as described above with reference to FIGS. 1, 5, and 7, and thus a detailed description thereof will be omitted.

The receiver 904 receives various messages and the like according to the control of the controller 906. In the present example, the various messages and the like, that the receiver 904 receives, are similar to those as described above with reference to FIGS. 1, 5, and 7, and thus a detailed description thereof will be omitted.

Particular aspects of the present disclosure may be implemented as a computer-readable code in a computer-readable recording medium. The computer-readable recording medium is a predetermined data storage device which can store data which can be read by a computer system. Examples of the computer readable recording medium may include a read-only memory (ROM), a random access memory (RAM), a compact disc ROM (CD-ROM), a magnetic tape, a floppy disk, an optical data storage device. The computer-readable recording medium may be distributed through computer systems connected to the network, and accordingly the computer-readable code is stored and executed in a distributed manner. Further, functional programs, codes and code segments for achieving the present disclosure may be easily interpreted by programmers skilled in the art which the present disclosure pertains to.

It will be understood that a method and apparatus according to an embodiment of the present disclosure may be implemented in the form of hardware, software, or a combination of hardware and software. Any such software may be stored, for example, in a volatile or non-volatile storage device such as a ROM, a memory such as a RAM, a memory chip, a memory device, or a memory integrated circuit (IC), or a recordable optical or magnetic medium such as a CD, a DVD, a magnetic disk, or a magnetic tape, regardless of its ability to be erased or its ability to be re-recorded. It can be also appreciated that the memory included in the mobile terminal is one example of machine-readable devices suitable for storing a program including instructions that are executed by a processor device to thereby implement embodiments of the present disclosure.

Accordingly, the present disclosure includes a program including a code for implementing the apparatus and method described in the appended claims of the specification and a machine (computer or the like)-readable storage medium for storing the program. Further, the program may be electronically transferred by a predetermined medium such as a communication signal transferred through a wired or wireless connection, and the present disclosure appropriately includes equivalents of the program.

Further, an apparatus according to an embodiment of the present disclosure may receive the program from a program providing device that is wiredly or wirelessly connected thereto, and may store the program. The program providing device may include a program including instructions through which a program processing device performs a preset content protecting method, a memory for storing information and the like required for the content protecting method, a communication unit for performing wired or wireless communication with the program processing device, and a controller for transmitting the corresponding program to a transceiver at the request of the program processing device or automatically.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for receiving buffer status information by an access point in a wireless communication system, the method comprising:
    determining a contention sub-slot and a dedicated sub-slot for each of stations connected to the access point;
    generating a data trigger action frame based on a first element including allocation information on the dedicated sub-slot to be used by a station among the stations in a buffer status report (BSR) phase for transmitting a BSR frame;
    broadcasting the generated data trigger action frame; and
    receiving the BSR frame transmitted based on the data trigger action frame from the station,
    wherein the dedicated sub-slot refers to resource where the station transmits the BSR frame in a non-contention scheme and is distinct from the contention sub-slot which refers to resource where the station transmits the BSR frame in a contention scheme.

2. The method of claim 1, wherein the first element includes information related to the station, and the data trigger action frame includes as many first elements as the number of the stations.

3. The method of claim 1, further comprising:
    generating a BSR trigger action frame based on a second element including information on a position of the dedicated sub-slot; and
    broadcasting the generated BSR trigger action frame to the stations.

4. The method of claim 3, wherein the second element includes information on slots related to the BSR phase, and the BSR trigger action frame includes as many second elements as a number of the slots related to the BSR phase.

5. The method of claim 3, wherein the BSR trigger action frame further includes a third element, and wherein the third element includes information on whether all sub-slots related to the BSR phase correspond to dedicated sub-slots, and information on a number of one or more slots related to the BSR phase.

6. The method of claim 1, further comprising:
    detecting a number of contention sub-slots, in which a collision occurs between BSR frames in the BSR phase, if the BSR frame is not successfully received; and
    adjusting a number of contention sub-slots of a next BSR phase after the BSR phase based on the detected number of the contention sub-slots.

7. A method for transmitting buffer status information by a station in a wireless communication system, the method comprising:
    receiving, from an access point, a data trigger action frame including allocation information on a dedicated sub-slot to be used by a corresponding station among stations for transmitting a BSR frame of the corresponding station in a buffer status report (BSR) phase; and
    transmitting a BSR frame of the station to the access point based on the received data trigger action frame,
    wherein the dedicated sub-slot refers to resource where the corresponding station transmits the BSR frame of the corresponding station in a non-contention scheme and is distinct from a contention sub-slot which refers to resource where the corresponding station transmits the BSR frame of the corresponding station in a contention scheme.

8. The method of claim 7, wherein the transmitting of the BSR frame of the station comprises:
    determining, based on the data trigger action frame, whether the dedicated sub-slot is allocated for the station;
    identifying a position of the dedicated sub-slot which is indicated by the data trigger action frame if the dedicated sub-slot is allocated for the station; and
    transmitting the BSR frame of the station to the access point in the dedicated sub-slot.

9. The method of claim 7, wherein the transmitting of the BSR frame of the station comprises:
    determining, based on the data trigger action frame, whether the dedicated sub-slot is allocated for the station;
    identifying positions of contention sub-slots which correspond to remaining sub-slots except for the dedicated sub-slot indicated by the data trigger action frame if the dedicated sub-slot is not allocated for the station;
    selecting one of the contention sub-slots; and
    transmitting the BSR frame of the station to the access point in the selected contention sub-slot.

10. The method of claim 7, further comprising receiving, from the access point, a BSR trigger action frame including information on a position of the dedicated sub-slot.

11. An access point for receiving buffer status information in a wireless communication system, the access point comprising:
    a controller configured to:
        determine a contention sub-slot and a dedicated sub-slot for each of stations connected to the access point, and
        generate a data trigger action frame based on a first element including allocation information on the dedicated sub-slot to be used by a station among the stations in a buffer status report (BSR) phase for transmitting a BSR frame;

a transmitter configured to broadcast the generated data trigger action frame; and a receiver configured to receive the BSR frame transmitted based on the data trigger action frame from the station, wherein the dedicated sub-slot refers to resource where the station transmits the BSR frame in a non-contention scheme and is distinct from the contention sub-slot which refers to resource where the station transmits the BSR frame in a contention scheme.

12. The access point of claim 11, wherein the first element includes information related to the station, and wherein the data trigger action frame includes as many first elements as the number of the stations.

13. The access point of claim 11, wherein the controller is further configured to generate a BSR trigger action frame based on a second element including information on a position of the dedicated sub-slot, and wherein the transmitter is further configured to broadcast the generated BSR trigger action frame to the stations.

14. The access point of claim 13, wherein the second element includes information on slots related to the BSR phase, and wherein the BSR trigger action frame includes as many second elements as a number of the slots related to the BSR phase.

15. The access point of claim 13, wherein the BSR trigger action frame further includes a third element, and wherein the third element includes information on whether all sub-slots related to the BSR phase correspond to dedicated sub-slots, and information on a number of one or more slots related to the BSR phase.

16. The access point of claim 12, wherein the controller is further configured to:

detect a number of contention sub-slots, in which a collision occurs between BSR frames in the BSR phase, if the BSR frame is not successfully received, and adjust a number of contention sub-slots of a next BSR phase after the BSR phase based on the detected number of the contention sub-slots.

17. A station for transmitting buffer status information in a wireless communication system, the station comprising:

a receiver configured to receive, from an access point, a data trigger action frame including allocation information on a dedicated sub-slot to be used by a corresponding station among stations for transmitting a BSR frame of the corresponding station in a (BSR) phase; and a transmitter configured to transmit a BSR frame of the station to the access point based on the received data trigger action frame, wherein the dedicated sub-slot refers to resource where the corresponding station transmits the BSR frame of the corresponding station in a non-contention scheme and is distinct from a contention sub-slot which refers to resource where the corresponding station transmits the BSR frame of the corresponding station in a contention scheme.

18. The station of claim 17, further comprising a controller configured to:

determine, based on the data trigger action frame, whether the dedicated sub-slot is allocated for the station, and identify a position of the dedicated sub-slot which is indicated by the data trigger action frame if the dedicated sub-slot is allocated for the station, wherein the transmitter is further configured to transmit the BSR frame of the station to the access point in the dedicated sub-slot.

19. The station of claim 17, further comprising a controller configured to:

determine, based on the data trigger action frame, whether the dedicated sub-slot is allocated for the station, identify positions of contention sub-slots which correspond to remaining sub-slots except for the dedicated sub-slot indicated by the data trigger action frame if the dedicated sub-slot is not allocated for the station, and select one of the contention sub-slots, wherein the transmitter is further configured to transmit the BSR frame of the station to the access point in the selected contention sub-slot.

20. The station of claim 17, wherein the receiver is further configured to receive, from the access point, a BSR trigger action frame including information on a position of the dedicated sub-slot.

* * * * *